United States Patent [19]

Jesinger

[11] Patent Number: 4,746,252
[45] Date of Patent: May 24, 1988

[54] SPINDLE OF A MACHINE TOOL

[75] Inventor: Richard Jesinger, Esslingen am Neckar, Fed. Rep. of Germany

[73] Assignee: Fortuna-Werke Maschinenfabrik GmbH, Stuttgart, Fed. Rep. of Germany

[21] Appl. No.: 52,629

[22] Filed: May 20, 1987

[30] Foreign Application Priority Data

May 21, 1986 [DE] Fed. Rep. of Germany ....... 3617103

[51] Int. Cl.$^4$ .......................... B23C 5/26; B23B 31/10
[52] U.S. Cl. ........................................ 409/233; 279/4; 408/239 R
[58] Field of Search ...................... 409/232, 233, 234; 408/238, 239 R, 239 A; 279/4, 8

[56] References Cited

U.S. PATENT DOCUMENTS

| 3,374,711 | 3/1968 | Saunders | 408/238 X |
|---|---|---|---|
| 3,895,881 | 7/1975 | Langlois | 409/232 X |
| 4,131,054 | 12/1978 | Johnson | 409/233 |
| 4,135,848 | 1/1979 | Hughes et al. | 409/233 X |
| 4,290,720 | 9/1981 | Ferreira | 409/233 |
| 4,560,310 | 12/1985 | Elkstein et al. | 409/233 |
| 4,583,894 | 4/1986 | Mitchell | 409/233 |
| 4,589,808 | 5/1986 | O'Connor | 409/233 |
| 4,604,009 | 8/1986 | Tennerstedt | 408/239 R |
| 4,640,653 | 2/1987 | Schartzman | 409/233 |

FOREIGN PATENT DOCUMENTS

| 2545713 | 10/1975 | Fed. Rep. of Germany | 409/233 |
|---|---|---|---|
| 61438 | 4/1982 | Japan | 409/233 |
| 42234 | 3/1984 | Japan | 409/233 |
| 499990 | 3/1976 | U.S.S.R. | 409/233 |
| 528152 | 10/1976 | U.S.S.R. | 409/233 |
| 560707 | 9/1977 | U.S.S.R. | 409/233 |
| 1181784 | 9/1985 | U.S.S.R. | 409/238 |

Primary Examiner—William R. Briggs
Attorney, Agent, or Firm—Rosenblum, Parish & Bacigalupi

[57] ABSTRACT

A spindle of a machine tool is mounted for rotation about a longitudinal axis. The spindle comprises clamping means for clamping and releasing a tool. An energy accumulator is charged when the tool is not clamped and is at least partly discharged to tighten the clamping means when the tool is clamped. An actuating unit serves to charge the energy accumulator by means of an external force supplied via a connection. To enable employment of the spindle at very high speeds, the actuating unit and the connection are arranged in the rotating part of the spindle. The spindle rotates at at least 30,000 revolutions per minute and the connection is a releasable plug or screw connection.

14 Claims, 4 Drawing Sheets

SPINDLE OF A MACHINE TOOL

The invention relates to a spindle of a machine tool mounted for rotation about a longitudinal axis, with clamping means for clamping and releasing a tool, with an energy accumulator assuming a first state of charge when the tool is not clamped and a second state of charge to tighten the clamping means when the tool is clamped, and with an actuating unit to effect a change in charge of the energy accumulator by means of an external force supplied via a connection.

A tool clamping device for a machine tool such as normally used for drilling or milling workpieces at speeds of up to several hundred revolutions per minute is known from German Pat. No. 2,545,713. A rotatable spindle comprising a taper bore for receiving a corresponding taper of a tool is provided in this known machine tool. Clamping means in the form of a collet chuck with radially outwardly extending hooks and an expander bar movable in the collet chuck are provided in the longitudinal axis of the spindle. These hooks engage an associated undercut annular groove in a central bore of the tool taper and the hooks are moved laterally outwardly into positive engagement with this annular groove by forward displacement of the expander bar so that the tool taper can be drawn into the tool holder of the spindle. At the end facing away from the collet chuck, the clamping means terminate in a sleeve which is supported against the spindle by means of a set of Belleville springs. From the side facing away from the spindle, a stationary piston-cylinder-unit can be acted upon by a hydraulic fluid, via a stationary connection, and the purpose of the piston of this unit is to push the clamping means forward into the taper bore of the tool holder of the spindle and to simultaneously compress the set of Belleville springs. If a tool is now inserted into the tool holder of the spindle from below, the hydraulic fluid is let out of the piston-cylinder-unit again by a suitably arranged switch pin so that the set of Belleville springs can at least partly relax and with its relaxing motion draw the tool into the tool holder of the spindle with high axial force.

This known device does, however, have the disadvantage of only being employable for conventional stationary machine tools with relatively low operating speeds where special problems relating to bearing, friction and imbalance do not arise.

Accordingly, the object underlying the invention is to further develop a spindle of the kind mentioned at the outset so as to enable employment thereof in high-speed machine tools at typical speeds of several ten thousand revolutions per minute.

This object is attained in accordance with the invention in that the actuating unit and the connection are arranged in the rotating part of the spindle, in that the spindle rotates at at least 30,000 revolutions per minute and in that the connection is a releasable connection.

The object underlying the invention is fully achieved by these measures because the spindle together with the actuating unit and the connection now form an integrated compact unit which can be made to rotate at the aforementioned high speeds by drive means, known per se, for example, a turbine or an electromagnetic drive. To clamp and release the tools, the auxiliary force, for example, a hydraulic or pneumatic fluid, an electric current or the like is supplied via the releasable plug or screw connection, and during tool release, the energy accumulator, for example, a spring accumulator, a magnetic accumulator, a pressure accumulator or the like is charged and upon release of the plug or screw connection can become at least partly discharged again, thereby enabling a tool inserted in a tool holder of the spindle to be automatically drawn in. In this state, the compact spindle unit can be rotated at the desired high speeds. Also, a major advantage of the inventive spindle is that the spindle can be equipped with a tool separately from the machine tool because the energy accumulator can be charged via the plug or screw connection independently of the machine tool and when the tool is inserted it can be partly discharged again to clamp the tool.

In a preferred embodiment of the invention, the actuating unit is a piston-cylinder-unit which can be supplied with a fluid via a plug which is connected to a pressure pipe and a socket which is arranged in a pressure-tight manner in the spindle.

In this embodiment, it is particularly expedient for the piston to be a differential piston with a first part of larger diameter and a second part of smaller diameter which run in corresponding first and second sections of a stepped bore, and, furthermore, for the first section to communicate with the connection, the second section to communicate with the energy accumulator in the form of a pressure accumulator, and the first section to communicate with the second section and with the pressure accumulator via a valve.

These measures have the advantage that the charging and discharging, respectively, of the energy accumulator are carried out almost fully automatically at the same time as the releasing and clamping, respectively, of the tool because in the course of the simultaneous releasing of the tool and charging of the energy accumulator, the fluid acts upon the larger surface of the differential piston and simultaneously charges the pressure accumulator, whereas when the fluid supply is switched off, the pressure accumulator can clamp the tool via the smaller surface of the differential piston while the larger surface is pressureless. A further advantage of the aforesaid measures is that the pressure accumulator is charged anew with each equipping operation so that any leakage losses are compensated again. Another advantage over the known energy accumulators with Belleville springs is that there is no necessity for these mechanical elements which have a tendency towards imbalance, furthermore, take up considerable space in comparison with a pressure accumulator and, in addition, have a substantial weight. Yet another advantage of the aforementioned measures is that the clamping forces are easily adapted to different tasks by simply changing the supply pressure of the fluid.

In a preferred further development of this embodiment, the valve is a check valve which, in a simple way, ensures separation of the pressure accumulator from the larger surface of the differential piston.

In a further embodiment of the invention, the check valve may comprise a valve member which closes under initial stress and can be raised from a valve seat by means of an actuating pin arranged on a plug. In particular, the check valve may be arranged in a channel which is in alignment with an axis of the socket.

These measures have the advantage that the check valve is automatically opened by means of the actuating pin when the supply plug is inserted into the socket so that the pressure accumulator can be quickly charged.

In embodiments of the invention, the pressure accumulator is arranged in the differential piston.

This has the advantage that the displaced mass and the dimensions of the piston are reduced since provision of a pressure accumulator involves provision of hollow spaces.

A particularly good effect is obtained by arranging the pressure accumulator axially symmetrically around the longitudinal axis of the spindle.

In particular, the pressure accumulator can comprise part of an annular space which contains a compressible medium and is separated from another part by an annular membrane.

These measures have the advantage that no imbalance is to be anticipated.

In a further group of embodiments, the actuating unit is a set of electrostrictive or magnetostrictive elements, in particular, peizoelectric elements which can be supplied with electrical energy via an electric connection means arranged on the spindle.

This measure has the advantage that clamping of the tool in the spindle is possible in a particularly simple way, namely by the supply of electrical energy. Furthermore, the electrostrictive or magnetostrictive elements used, in particular, piezoelectric elements operate in a wearfree manner and are available in a configuration with which very high clamping forces can also be generated. In this way, the clamping force can be unproblematically metered by suitable adjustment of the supply voltage or supply current.

In a preferred variant of this embodiment, the electric connection means is a sliding contact which extends over a circumference of the spindle.

This measure has the advantage that the actuating unit can be "recharged" also while the spindle rotates if the voltage generated by the elements should have dropped, for example, on account of leakage current losses.

In a further preferred variant of these embodiments, the tool can be drawn into the spindle against a first axial stop by means of a draw-in bar and the elements are arranged between a second axial stop facing the tool and a flange of the draw-in bar facing away from the tool.

This measure has the advantage that when the tool is drawn into the spindle by the draw-in bar, the expansion of the elements is made use of so that when the tool is clamped, the element are subjected to a compressive load, a load which they can more readily withstand over a longer period of time than tensile load.

It is particularly expedient for the elements to be in the form of annular elements, for the draw-in bar to pass through the annular elements and for the flange to be in the form of a disk which is axially rigidly connected to the draw-in bar.

This results in a very compact and space-saving design with a minimum requirement of mechanical elements so that the inherent weight and, consequently, the moment of inertia of the spindle is reduced, which is particularly advantageous for spindles rotating extremely quickly.

Finally, of all embodiments mentioned hereinabove, an embodiment of the invention is preferred which is characterized in that in a first position for insertion of the tool into the spindle, the elements guide the actuating unit out of a zero position of the clamping travel through part of the clamping travel; in a second position for clamping the tool in the spindle, the elements hold the actuating unit at maximum clamping trave; and in third position for releasing the tool from the spindle, the elements return the actuating unit to the zero position of the clamping travel.

This measure has the advantage that due to the already partly "initially stressed" position of the actuating unit at the moment of insertion of the tool, for example, manually or by a gripper of a handling system, on the one hand, there is still sufficient clamping travel left for the tool to be held securely in the tool holder of the spindle, but, on the other hand, additional travel in the opposite direction out of the spindle is possible for release of the tool, i.e., by releasing the actuating unit completely, thereby ensuring that the tool can be ejected and removed from the spindle.

Further advantages will be apparent from the specification and the accompanying drawings.

It will be understood that the features mentioned herein-above and explained in further detail hereinbelow may be employed not only in the stated combination but also in other combinations or alone without departing from the scope of the present invention.

Embodiments of the invention are illustrated in the drawings and are explained in greater detail in the following specification. In the drawings.

Figure 1:
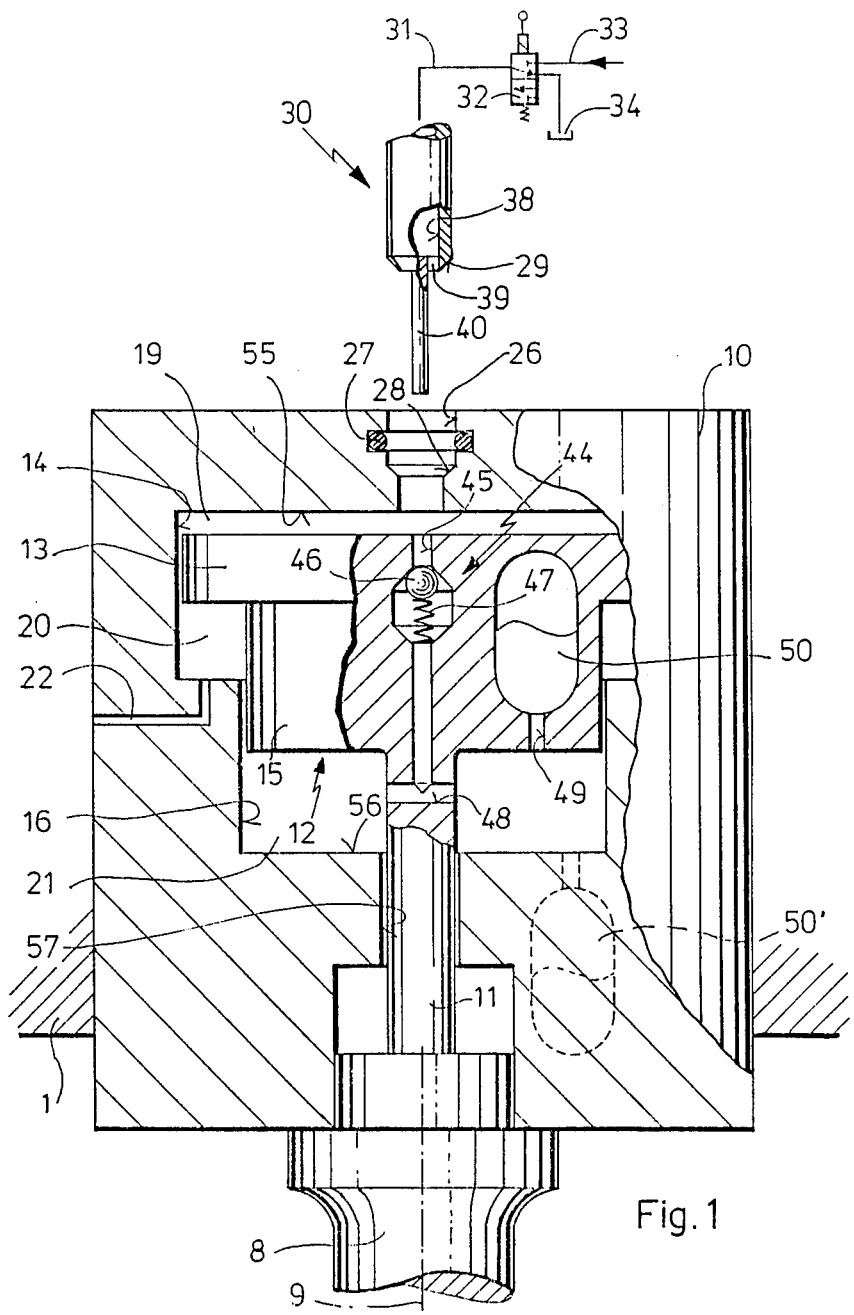
FIG. 1 is a side view of an embodiment of a spindle according to the invention, with parts broken away and parts broken off.

A spindle 10 in a spindle bearing 1 of a machine tool, not illustrated, which holds a tool 8 and is rotatable about a longitudinal axis 9 is apparent from FIG. 1. At its lower end, shown in broken-off illustration, the spindle 10 terminates in a draw-in bar 11 carrying at its other end, in a manner known per se, a collet chuck, expander elements with hooks or the like to enable the tool 8, for example, a grinding wheel to be drawn into a corresponding tool holder of the spindle 10 and fixed there.

At its upper end, the draw-in bar 11 terminates in a differential piston 12 comprising a first part 13 of larger diameter which runs in a first section 14 of a stepped bore. Located below the first part 13 is a second part 15 of the differential piston 12 which runs in a corresponding second section 16 of a stepped bore. In this way, axial motion of the differential piston 12 in the stepped bore produces a first hollow space 19 above the first part 13, a second hollow space 20 below the first part 13 and a third hollow space 21 below the second part 15 in the stepped bore. An air-release bore 22 extends outwardly from the second hollow space 20.

Disposed in the upper side of the spindle 10 is a socket 26 with an O ring 27 or another suitable sealing means, and the socket 26 comprises a contour 28 which corresponds in mirror image to a contour 29 of a plug 30. The plug 30 which can be inserted into the socket 26 in a pressure-tight manner and released from it again is connected to a pressure pipe 31 for delivery and discharge of a fluid, for example, hydraulic oil or compressed air. Arranged in the pressure pipe 31 is a magnetic valve 32 by means of which the pressure pipe 31 is selectively connectable to a pipe 33 leading to a pressure source or to a pressureless reservoir 34.

The interior of the plug 30 is designed so as to comprise a central bore 38 which communicates with the pressure pipe 31. The central bore 38 leads into an opening 39 on the end face and a central actuating pin 40 extends from the center of the opening away from the plug 30. The actuating pin 40 may be held in the opening 39 by, for example, webs which are distributed in star-shaped configuration.

The socket 26 is preferably so arranged that it is in alignment with the longitudinal axis 9 of the spindle 10. Arranged in the differential piston 12, likewise in alignment with the socket 26, is a check valve 44 positioned within the longitudinal extent of an axial bore 45. In the simplest case, the check valve 44 may consist of a ball 46 which is pressed against a valve seat by the spring load of a spring 47.

Below the check valve 44 and below the lower side of the second part 15 of the differential piston 12, the axial bore 45 opens into a transverse bore 48 which leads into the third hollow space 21.

From the third hollow space 21, a channel 49 leads to a pressure accumulator 50 arranged in the differential piston 12, but it will be understood that the pressure accumulator 50 may also be arranged in the spindle 10, as indicated by 50'.

This results in a piston-cylinder-unit wherein the travel of the differential piston 12 is delimited by an upper end face 55 and a lower end face 56 of the stepped bore and the draw-in bar 11 extends downwardly through a further bore 57 out of the area of the stepped bore.

The manner in which the spindle 10 according to FIG. 1 operates will now be explained with reference to the phase illustrations in FIGS. 2a to 2c; these Figures contain only some of the reference numerals of FIG. 1.

Figures 2A, 2B, 2C:
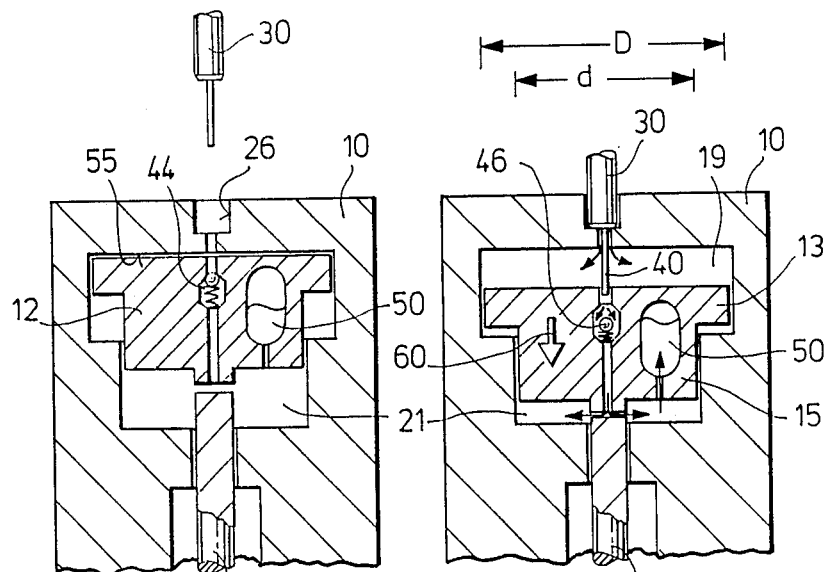
FIGS. 2a to 2c are three phase illustrations explaining the manner in which the spindle according to FIG. 1 operates.

FIG. 2a shows a relaxed initial position of the spindle 10. With the socket 26 in the unclosed state, the differential piston 12 is located at the upper stop, namely at the upper end face 55 as there is still a certain amount of over-pressure in the third hollow space 21 due to a certain residual pressure in the pressure accumulator 50 and to the closed check valve 44. The draw-in bar 11 which in this position does not have a tool clamped at its lower end is also in its extreme upper position.

In preparation for the clamping of a tool in the spindle 10, which until then had not been equipped with such, the plug 30 is now introduced into the socket 26. It was already clear from FIG. 1 that the plug 30 is made to sit in a pressure-tight manner in the socket 26 by the O ring 27 and the contours 28, 29, more particularly, such that the opening 39 on the end face allows flow of a pressure fluid from the central bore 38 of the plug 30 into the stepped bore.

Furthermore, the length of the central actuating pin 40 is of such dimensions that the ball 46 is raised from its valve seat when the plug 30 is introduced into the socket 26 to thereby clear the way for passage of the pressure fluid through the central bore 45.

In FIG. 2b, the arrows indicated by strokes show how the pressure fluid is distributed within the spindle 10 when the plug 30 has been inserted into the socket 26 and the magnetic valve 32 has been switched to the position not shown in FIG. 1 so that the pressure pipes 31 and 33 are in communication with one another.

The pressure fluid flows, on the one hand, into the first hollow space 19 and, on the other hand, past the ball 46 raised from its seat, through the axial bore 45 and the transverse bore 48 into the third hollow space 21 and from there through the channel 49 into the pressure accumulator 50 which is thus "charged".

Since the diameter D of the first part 13 of the differential piston 12 is larger than the diameter d of the second part 15, but, on the other hand, the pressure in the first hollow space 19 is just as great as the pressure in the third hollow space 21, the differential piston 12 moves downwardly along arrow 60 and the draw-in bar 11 which is rigidly connected to the differential piston 12 likewise moves downwardly along arrow 61. This motion in the downward direction continues until a mechanical stop is reached or the transverse bore 48 is covered by the axial bore 57 of the spindle 10, in which case, after further short downward travel of the differential piston 12, a balance of forces occurs as a result of pressure increase in the third hollow space 21.

When the tool has been fixed in a manner known per se at the lower end of the draw-in bar 11 and a signal for clamping the tool has been given by a switch pin or the like, similarly not illustrated for reasons of clarity, the magnetic valve 32 is first switched over so that the first hollow space 19 is now made pressureless. The ball 46 which in the position according to FIG. 2b is outside of the range of engagement with the actuating pin 40 now returns to its valve seat and blocks the central bore 45. The plug 30 is now withdrawn from the spindle 10 and this must take place before the differential piston 12 has moved up again so far that the ball 46 comes into contact with the actuating pin 40 again.

This state is illustrated in FIG. 2c. The upward motion of the differential piston 12 in the direction of arrow 62 and of the draw-in bar 11 in the direction of arrow 63 occurs because the first hollow space 19 is pressureless and the work pressure of the pressure fluid with which the pressure accumulator 50 had previously been charged now prevails in the third hollow space 21. Pressure fluid now flows out of the pressure accumulator 50 into the third hollow space 21 so that the differential piston 12 is displaced in the upward direction. This displacement motion continues until the tool has been safely drawn into an associated tool holder of the spindle.

When the tool is to be released again after completion of the machining of the workpiece, it is merely necessary, as illustrated in FIG. 2b, for the plug 30 to be inserted into the socket 26 again and for pressure to be introduced into the first hollow space 19.

Figure 3:
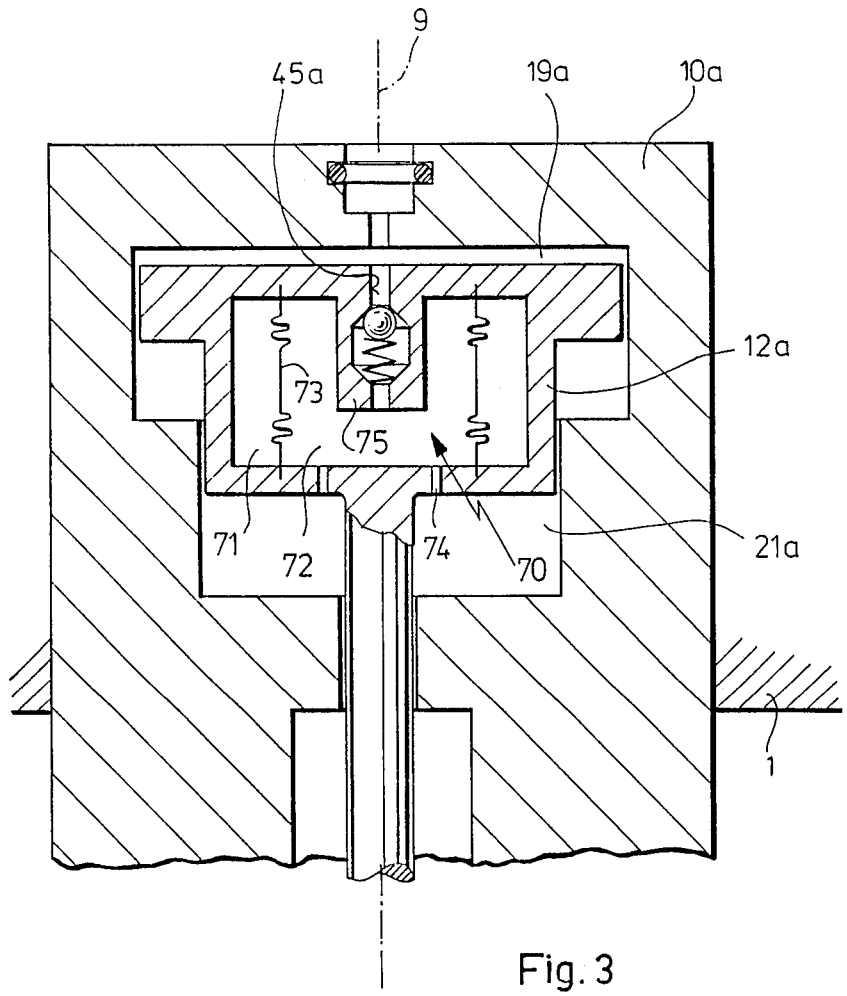
FIG. 3 is an illustration similar to FIG. 1, but of another embodiment of the invention.

The further embodiment of an inventive spindle 10a illustrated in FIG. 3 differs from the previously described embodiments solely in the design of the interior of the differential piston 12a.

In this embodiment, there is provided in the differential piston 12a an axially symmetrical annular space 70 which is divided up into an outer part 71 and an inner part 72 which are separated from each other by an annular membrane 73, for example, a hose membrane. The outer part 71 of the annular space 70 is filled with a compressible medium, for example, a gas.

Channels 74 lead from the inner part 72 of the annular space 70 to the third hollow space 21a. In this embodiment, the central bore 45a terminates in a cylindrical projection 75 in the inner part 72 of the annular space 70.

The embodiment illustrated in FIG. 3 operates in exactly the same manner as that already explained with reference to FIGS. 2a to 2c. When a tool is released, the fluid enters at operating pressure the first hollow space 19a, the third hollow space 21a and also the inner part 72 of the annular space 70. The annular membrane 73 cooperates with the outer part 71 of the annular space 70 as pressure accumulator which is "charged38 by this subjection to the operating pressure, while the differential piston 12a moves downwardly. After relaxation of the first hollow space 19a, the annular membrane 73 which had previously been outwardly deformed moves inwardly again and presses pressure fluid through the channels 74 to the third hollow space 21a so that the differential piston 12a moves upwardly again and clamps the tool.

Figure 4:
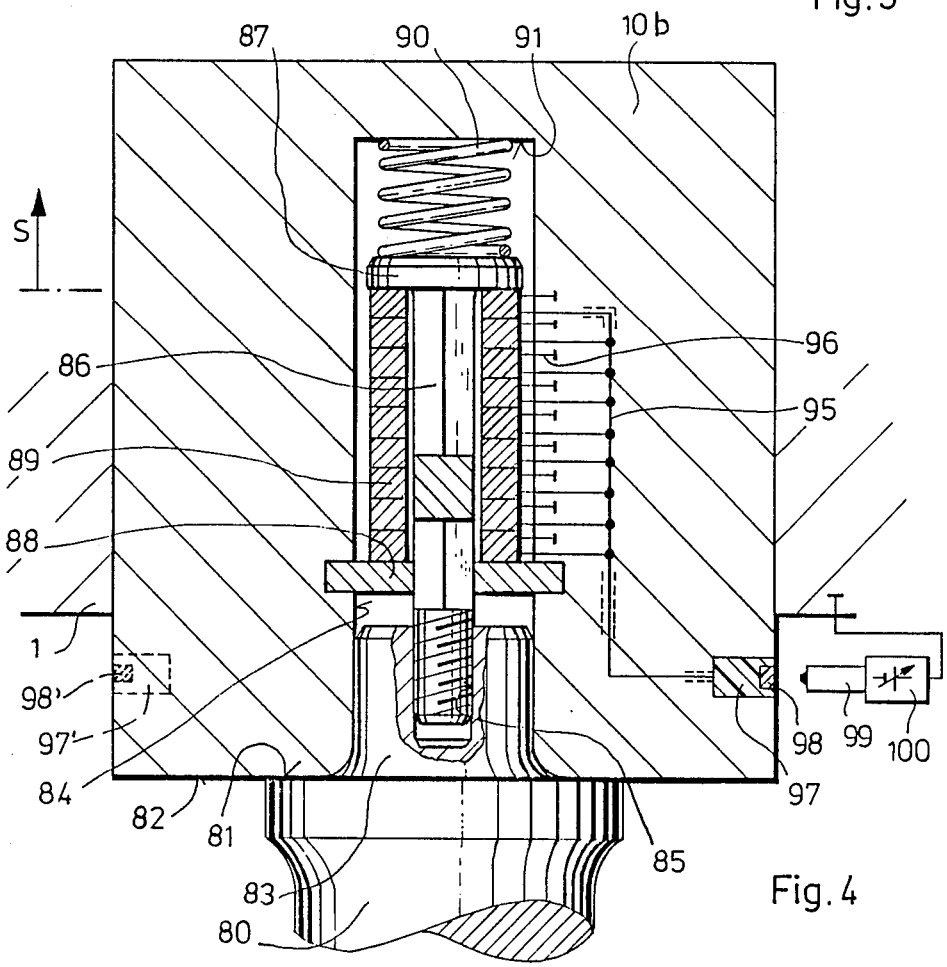
FIG. 4 is an illustration similar to FIG. 1, but of a further embodiment of a spindle according to the invention with a piezoelectric clamping device.

FIG. 4 shows in an illustration similar to FIG. 1 a further embodiment of an inventive spindle 10b which is to be rotated at a very high speed about its longitudinal axis in the spindle bearing 1.

A tool 80 is to be inserted into the spindle 10b from the lower end of the spindle 10b. Extending around the tool 80 is a radial shoulder 81 which comes to rest against a parallel external surface 82 of the spindle 10b when the tool 80 is inserted into the spindle 10b. An axial shank 83 of the tool 80 then protrudes into an axial first bore 84 of the spindle 10b. The shank 83 is provided with a central second bore 85 in the form of a threaded blind bore. If the tool 80 is brought up to the spindle 10b from below, manually or by means of a suitable handling device, the shank 83 is inserted into the first bore 84 and screwed by means of the second bore 85, the threaded blind bore, onto a matching counter thread of a draw-in bar 86 which is cylindrical in this area and is an axial position in the spindle 10b.

The draw-in bar 86 carries a radial disk 87 at its end located opposite to the threaded section and penetrates a guide plate 88 in an area adjacent to the threaded section. The guide plate 88 is axially fixed at the edge of the first bore 84. In the area penetrating the guide plate 88, the draw-in bar 86 is non-circular, for example, of square cross section, as indicated in FIG. 4. The associated opening in the guide plate 88 encompasses the non-circular circumferences of the draw-in bar 86 in positive engagement therewith so that, in all, the draw-in bar 86 is mounted in the spindle 10b so as to be non-rotatable but axially displaceable within certain limits. It will, however, be understood that the non-rotatable bearing of the draw-in bar 86 may also be realized in a different manner, for example, by the disk 87 being of non-circular configuration and extending in a correspondingly designed section of the second bore 84 in positive engagement therewith or by other measures likewise known per se for non-rotatable arrangement of a bar.

Located between the disk 87 and the guide plate 88 is a set of piezoelectric elements 89 which, depending on the application, are adjustable in number and thickness. In the extreme case, one single piezoelectric element 89 would also be sufficient.

Finally, the disk 87 is supported by means of a helical spring 90 against a bottom 91 of the first bore 84 which is located opposite the tool 80.

It will be understood that magnetostrictive elements or other elements adjustable in length by means of electric energy may also be used instead of the piezoelectric elements 89.

The piezoelectric elements 89 illustrated by way of example may be wired in different ways. In the embodiment of FIG. 4, all of the piezoelectric elements 89 are connected in parallel by being connected in the area of a contact surface to an insulated cable 95, while they are provided with ground connections 96 on the respective opposite contact surface. It will, however, be understood that, if required, the piezoelectric elements 89 may also be connected in series or groups thereof connected in series/in parallel, depending on what is expedient in the individual case.

The insulated cable 95 extends through the spindle 10b to an insulated socket 97 comprising on its outer side a touching or sliding contact 98 or another electric connection means, for example, a plug engaging positively therewith.

As separte element, a slider 99 is connected to an adjustable power source 100. When the slider 99 touches the sliding contact 98 there is voltage at the piezoelectric elements 89 so that these expand or contract in the axial direction, depending on the power adjustment or voltage adjustment. It is particularly expedient for the sliding contact 98 to extend around the spindle 10b in the circumferential direction thereof, as indicated by 97', 98' since the slider 99 can then be in continuous contact with the sliding contact 98 also while the spindle 10b rotates.

Figure 5:
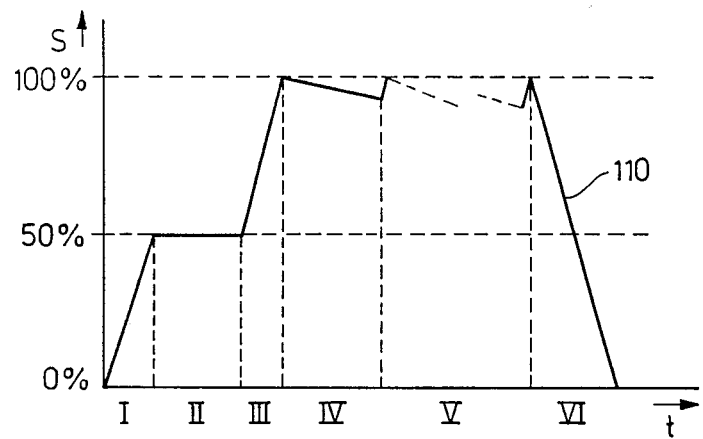
FIG. 5 is a diagram illustrating clamping travel as a function of time in a particularly preferred procedure for using spindles according to the invention.

FIG. 5 shows a possible procedure for inserting and clamping the tool 8 in the embodiment of FIGS. 1 and 3, respectively, or 80 in the embodiment of FIG. 4. FIG. 5 illustrates the drawing-in travel s which is plotted as a function of the time t.

During a first phase I—in which the tool 8 or 80, respectively, is not yet clamped—the draw-in bar 11 or 86, respectively, is already drawn in by 50% of the maximum possible drawing-in travel s. In the embodiment of FIG. 4, this may, for example, be effected by half of the rated voltage being applied to the piezoelectric elements 89.

During the subsequent phase II, the tool 8 or 80, respectively, is manually inserted into the spindle 10 or 10b, respectively, for example, screwed on loosely by hand to the bottom end of the draw-in bar 86, in the manner illustrated in FIG. 4. In a third phase III, the draw-in bar 86 is drawn in by the full extent of clamping tavel s to 100% of this travel and the tool 8 or 80, respectively, is, in this way, firmly clamped to the spindle 10 or 10b, respectively.

In the case of the "rechargeable" clamping means of FIG. 4, the piezoelectric elements 89 can be recharged from time to time in subsequent phases IV and V if they should become partly discharged in the course of time due to leakage currents.

To release the tool 8 or 80, respectively, the draw-in bar 11 or 86, respectively, is driven out again to 0% of the clamping travel s, i.e., by 50% of the travel more than the position in which the tool 8 or 80, respectively, was manually inserted. Since the tool now protrudes out of the spindle 10 or 10b, respectively, namely by 50% of the maximum clamping travel s, the tool 8 or 80, respectively, can be easily released.

What is claimed is:

1. A spindle of a machine tool mounted for rotation about a longitudinal axis and comprising:
    drive means for driving a rotating part of said spindle at at least 30,000 revolutions per minute;

clamping means for clamping and releasing a tool resp.;

energy storing means assuming a first state of charge when said tool is not clamped and assuming a second state of charge resp. to tighten said clamping means when said tool is to be clamped;

actuating means for effecting a change between said first and second state of charge of said energy storing means;

releasable connection means for supplying an external force to said actuating means for effecting said change, said clamping means, said energy storing means, said actuating means and said connection means being all arranged in said rotating part of said spindle.

2. A spindle as defined in claim 1, wherein said actuating means comprises a piston-cylinder-unit, being arranged to be supplied with a fluid via a plug, said plug being connected to a pressure line and being shaped to be received in a pressure-tight socket, said socket being arranged in said spindle.

3. A spindle as defined in claim 2, wherein said piston is a differential piston with a first portion of larger diameter and a second portion of smaller diameter, said portions running in corresponding first and second sections resp. of a stepped bore; said first section communicating with said connection means; said second section communicating with said energy storing means, said energy storing means being a pressure store and said first section communicating with said second section and also with said pressure store via a valve.

4. A spindle as defined in claim 3, wherein said valve is a check valve.

5. A spindle as defined in claim 4, wherein said check valve comprises a valve member closing under bias and raising from a valve seat under application of an actuating pin arranged on said plug.

6. A spindle as defined in claims 4 or 5, wherein said check valve is arranged in a bore, said bore being in alignment with an axis of said socket.

7. A spindle as defined in claim 3, wherein said pressure store is arranged in said differential piston.

8. A spindle as defined in claim 3, wherein said pressure store is axially symmetrically arranged around said longitudinal axis of said spindle.

9. A spindle as defined in claim 8, wherein said pressure store comprises a first part of an annular space containing a compressible medium and is separated from a second part via an annular membrane.

10. A spindle as defined in claim 1, wherein said actuating means comprises a set of electrostrictive or magnetostrictive elements, in particular, piezoelectric elements, said elements being arranged to be supplied with electrical energy via an electric connection means arranged on a non-rotating part of said spindle.

11. A spindle as defined in claim 10, wherein said electric connection means comprises a sliding contact running over a circumference of said rotating part of said spindle.

12. A spindle as defined in claim 10, wherein a draw bar is provided for drawing said tool into said spindle against a first axial stop, said elements being arranged between a second axial stop facing said tool and a flange of said drawin bar facing away from said tool.

13. A spindle as defined in claim 12, wherein said elements are shaped as annular elements, said draw-in bar passing through said annular elements; and said flange being shaped as a disk, said disk being axially rigidly connected to said draw-in bar.

14. A spindle as defined in claim 1, wherein to get into a first position for insertion of said tool into said spindle, said actuating means are displaced out of a zero position of a total clamping travel through part of said clamping travel, wherein, further, to get into a second position for clamping said tool in said spindle, said actuating means are displaced into a maximum of said clamping travel and are held therein, and wherein to get into a third position for releasing said tool from said spindle, said actuating means are returned into said zero position of said clamping travel.

* * * * *